United States Patent
Yang et al.

(10) Patent No.: US 9,923,223 B2
(45) Date of Patent: Mar. 20, 2018

(54) ELECTROLYTE MEMBRANE, DISPERSION AND METHOD THEREFOR

(71) Applicant: Audi AG, Ingolstadt (DE)

(72) Inventors: Zhiwei Yang, South Windsor, CT (US); Mallika Gummalla, Longmeadow, MA (US)

(73) Assignee: Audi AG, Ingolstadt (DE)

( * ) Notice: Subject to any disclaimer, the term of this patent is extended or adjusted under 35 U.S.C. 154(b) by 76 days.

(21) Appl. No.: 14/654,448

(22) PCT Filed: Dec. 21, 2012

(86) PCT No.: PCT/US2012/071391
§ 371 (c)(1),
(2) Date: Jun. 19, 2015

(87) PCT Pub. No.: WO2014/098910
PCT Pub. Date: Jun. 26, 2014

(65) Prior Publication Data
US 2015/0340721 A1    Nov. 26, 2015

(51) Int. Cl.
*H01M 8/1039* (2016.01)
*H01M 8/106* (2016.01)
(Continued)

(52) U.S. Cl.
CPC ......... *H01M 8/1039* (2013.01); *C08F 14/18* (2013.01); *C08J 5/225* (2013.01); *C08L 27/12* (2013.01);
(Continued)

(58) Field of Classification Search
CPC .. H01M 8/1039; H01M 8/106; H01M 8/1044; H01M 8/1023; H01M 8/1081;
(Continued)

(56) References Cited

U.S. PATENT DOCUMENTS 3,282,875 A    11/1966  Connolly et al.
5,463,005 A    10/1995  Desmarteau
(Continued)

FOREIGN PATENT DOCUMENTS

CN    1201554 A    12/1998
CN    1964115 A    5/2007
(Continued)

OTHER PUBLICATIONS

Alcaide et al., "Performance of carbon-supported PtPd as catalyst for hydrogen oxidation in the anodes of proton exchange membrane fuel cells," *International Journal of Hydrogen Energy* 35:11634-11641, 2010.

(Continued)

*Primary Examiner* — Jane Rhee
(74) *Attorney, Agent, or Firm* — Seed IP Law Group LLP

(57) ABSTRACT

A method of producing an electrolyte membrane includes providing a dispersion solution that has a crosslinked perfluorinated ionomer material and a linear perfluorinated ionomer material dispersed in a carrier fluid or mixture carrier fluids. The crosslinked perfluorinated ionomer material has an equivalent weight of 750 g/mol or less with respect to proton exchange acid groups. The linear perfluorinated ionomer material has an equivalent weight of 750 g/mol or more with respect to proton exchange as acid groups. At least a portion of the carrier fluid or fluids is removed from the dispersion solution to thereby form an electrolyte membrane with the crosslinked perfluorinated ionomer material and the linear perfluorinated ionomer material.

15 Claims, 2 Drawing Sheets

(51) Int. Cl.

| | | |
|---|---|---|
| *H01M 8/1044* | (2016.01) | |
| *H01M 8/1023* | (2016.01) | |
| *H01M 8/1081* | (2016.01) | |
| *C08F 14/18* | (2006.01) | |
| *C08L 27/12* | (2006.01) | |
| *C09D 127/12* | (2006.01) | |
| *H01M 8/1016* | (2016.01) | |
| *H01M 8/1069* | (2016.01) | |
| *H01M 8/0293* | (2016.01) | |
| *C08J 5/22* | (2006.01) | |
| *H01M 8/1018* | (2016.01) | |

(52) U.S. Cl.
CPC ........ *C09D 127/12* (2013.01); *H01M 8/0293* (2013.01); *H01M 8/106* (2013.01); *H01M 8/1016* (2013.01); *H01M 8/1023* (2013.01); *H01M 8/1044* (2013.01); *H01M 8/1069* (2013.01); *H01M 8/1081* (2013.01); *H01M 2008/1095* (2013.01); *H01M 2250/20* (2013.01); *H01M 2300/0082* (2013.01); *H01M 2300/0085* (2013.01); *Y02E 60/521* (2013.01); *Y02P 70/56* (2015.11); *Y02T 90/32* (2013.01)

(58) Field of Classification Search
CPC ............. H01M 8/1069; H01M 8/0293; H01M 2008/1095; H01M 2300/0082; H01M 2300/0085; H01M 2250/20
See application file for complete search history.

(56) References Cited

U.S. PATENT DOCUMENTS

| | | |
|---|---|---|
| 5,608,022 A | 3/1997 | Nakayama et al. |
| 5,869,416 A | 2/1999 | Mussell |
| 5,882,810 A | 3/1999 | Mussell et al. |
| 6,106,963 A | 8/2000 | Nitta et al. |
| 6,232,264 B1 | 5/2001 | Lukehart et al. |
| 6,277,512 B1 | 8/2001 | Hamrock et al. |
| 6,294,612 B1 | 9/2001 | O'Brien |
| 6,733,914 B1 | 5/2004 | Grot et al. |
| 7,112,363 B2 | 9/2006 | Moya |
| 7,288,600 B2 | 10/2007 | Moya |
| 7,507,495 B2 | 3/2009 | Wang et al. |
| 7,615,307 B2 | 11/2009 | Wu et al. |
| 7,691,780 B2 | 4/2010 | Adzic et al. |
| 7,740,974 B2 | 6/2010 | Masel et al. |
| 7,837,901 B2 | 11/2010 | Hsu et al. |
| 7,855,021 B2 | 12/2010 | Adzic et al. |
| 7,906,052 B2 | 3/2011 | Hadj Romdhane et al. |
| 8,216,680 B2 | 7/2012 | Hsu et al. |
| 2002/0160272 A1 | 10/2002 | Tanaka et al. |
| 2003/0096156 A1 | 5/2003 | Asaoka et al. |
| 2004/0241518 A1 | 12/2004 | Yang |
| 2005/0075240 A1 | 4/2005 | Yamamoto |
| 2005/0095487 A1 | 5/2005 | Hamrock et al. |
| 2005/0112434 A1 | 5/2005 | Park et al. |
| 2005/0113528 A1 | 5/2005 | Jing et al. |
| 2005/0186467 A1 | 8/2005 | Sugiura |
| 2006/0093885 A1 | 5/2006 | Krusic et al. |
| 2007/0069185 A1 | 3/2007 | Hsu et al. |
| 2007/0218342 A1 | 9/2007 | Han et al. |
| 2007/0281199 A1 | 12/2007 | Lousenberg |
| 2007/0282023 A1 | 12/2007 | Lousenberg |
| 2008/0206616 A1 | 8/2008 | Atanassova et al. |
| 2008/0292931 A1 | 11/2008 | Schwartz et al. |
| 2009/0026944 A1 | 1/2009 | Riviere-Cazaux |
| 2009/0053576 A1 | 2/2009 | Wu |
| 2009/0068541 A1 | 3/2009 | Yan |
| 2009/0075139 A1 | 3/2009 | Kucernak et al. |
| 2009/0220682 A1 | 9/2009 | Monnier et al. |
| 2009/0269644 A1 | 10/2009 | Hamrock et al. |
| 2010/0008840 A1 | 1/2010 | Zhong et al. |
| 2010/0086831 A1 | 4/2010 | Fisher et al. |
| 2010/0086832 A1 | 4/2010 | Lopez et al. |
| 2010/0092841 A1 | 4/2010 | Lopez et al. |
| 2010/0099012 A1 | 4/2010 | Adzic |
| 2010/0216632 A1 | 8/2010 | Adzic et al. |
| 2010/0304267 A1 | 12/2010 | Mikhail et al. |
| 2010/0316937 A1 | 12/2010 | Sakamoto et al. |
| 2011/0200915 A1 | 8/2011 | Goto et al. |
| 2011/0223444 A1 | 9/2011 | Brown et al. |
| 2012/0046164 A1 | 2/2012 | Tanaka et al. |
| 2012/0251926 A1 | 10/2012 | Shirvanian |
| 2013/0059219 A1 | 3/2013 | Kimura et al. |
| 2013/0281555 A1 | 10/2013 | Yang et al. |
| 2013/0295486 A1 | 11/2013 | Shao |
| 2013/0319871 A1 | 12/2013 | Murata et al. |
| 2013/0330657 A1 | 12/2013 | Shoemaker et al. |
| 2014/0038078 A1 | 2/2014 | Shao |
| 2014/0178575 A1 | 6/2014 | Iio et al. |
| 2015/0255798 A1 | 9/2015 | Shao |
| 2015/0333354 A1 | 11/2015 | Yang et al. |
| 2015/0337064 A1 | 11/2015 | Yang et al. |

FOREIGN PATENT DOCUMENTS

| | | |
|---|---|---|
| CN | 1973391 A | 5/2007 |
| CN | 101318131 A | 12/2008 |
| CN | 101875010 A | 11/2010 |
| CN | 102039124 A | 5/2011 |
| JP | H10284087 A | 10/1998 |
| JP | H10340732 A | 12/1998 |
| JP | 2000-188013 A | 7/2000 |
| JP | 2002-042825 A | 2/2002 |
| JP | 2002212234 A | 7/2002 |
| JP | 2002-324559 A | 11/2002 |
| JP | 2003-246906 A | 9/2003 |
| JP | 2005-248104 A | 9/2005 |
| JP | 2005-272970 A | 10/2005 |
| JP | 2007-157645 A | 6/2007 |
| JP | 2008-186798 A | 8/2008 |
| JP | 2008-210572 A | 9/2008 |
| JP | 2009-054339 A | 3/2009 |
| JP | 2009-539225 A | 11/2009 |
| JP | 2010-089031 A | 4/2010 |
| JP | 2010-092799 A | 4/2010 |
| JP | 2010-214330 A | 9/2010 |
| JP | 2011-040363 A | 2/2011 |
| JP | 2011040363 A | 2/2011 |
| JP | 2011-089143 A | 5/2011 |
| JP | 2011-134477 A | 7/2011 |
| JP | 2011-137216 A | 7/2011 |
| JP | 2011-218278 A | 11/2011 |
| JP | 2012-102345 A | 5/2012 |
| JP | 2012226970 A | 11/2012 |
| JP | 5699287 B2 | 4/2015 |
| WO | 97/13287 A2 | 4/1997 |
| WO | 2005045978 A2 | 5/2005 |
| WO | 2007/142884 A2 | 12/2007 |
| WO | 2009/045879 A2 | 4/2009 |
| WO | 2009/139747 A1 | 11/2009 |
| WO | 2009/139748 A1 | 11/2009 |
| WO | 2009/139749 A1 | 11/2009 |
| WO | 2010/048407 A1 | 4/2010 |
| WO | 2010/107426 A1 | 9/2010 |
| WO | 2010/123896 A2 | 10/2010 |
| WO | 2010/132050 A1 | 11/2010 |
| WO | 2011/112608 a1 | 9/2011 |
| WO | 2011129967 A2 | 10/2011 |
| WO | 2011/148466 A1 | 12/2011 |
| WO | 2012/096653 A1 | 7/2012 |
| WO | 2012/105107 A1 | 8/2012 |
| WO | 2012/125138 A1 | 9/2012 |
| WO | 2012/144974 A1 | 10/2012 |
| WO | 2012/174463 A1 | 12/2012 |

OTHER PUBLICATIONS

Greeley et al., "Theoretical Trends in Particle Size Effects for the Oxygen Reduction Reaction," *Zeitschrift fur Physikalische Chemie* 221(9-10):1209-1220, 2007.

(56) References Cited

OTHER PUBLICATIONS

Kondo et al., "Active Sites for the Oxygen Reduction Reaction on the Low and High Index Planes of Palladium," *The Journal of Physical Chemistry Letters C* 113(29):12625-12628, 2009.

Lim et al., "Facile Synthesis of Bimetallic Nanoplates Consisting of Pd Cores and Pt Shells through Seeded Epitaxial Growth," *Nano Letters* 8(8):2535-2540, 2008.

Lim et al., "Pd-Pt Bimetallic Nanodendrites with High Activity for Oxygen Reduction," *Science* 324:1302-1305, Jun. 2009.

Neburchilov et al., "A review of polymer electrolyte membranes for direct methanol fuel cells," *Journal of Power Sources* 169:221-238, 2007.

Niu et al., "Seed-Mediated Growth of Nearly Monodisperse Palladium Nanocubes with Controllable Sizes," *Crystal Growth & Design* 8(12):4440-4444, 2008.

Stamenkovic et al., "Improved Oxygen Reduction Activity on $Pt_3Ni(111)$ via Increased Surface Site Availability," *Science* 315:493-497, 2007.

Tao et al., "Shape Control of Colloidal Metal Nanocrystals," *small* 4(3):310-325, 2008.

Vidal-Iglesias et al., "Pd Adatom Decorated (100) Preferentially Oriented Pt Nanoparticles for Formic Acid Electrooxidation," *Angewandte Chemi International Edition* 122:7152-7155, 2010.

Zhang et al., "Platinum Monolayer Electrocatalysts for $O_2$ Reduction: Pt Monolayer on Pd(111) and on Carbon-Supported Pd Nanoparticles," *J. Phys. Chem. B* 108:10955-10964, 2004.

Zhang et al., "Platinum Monolayer on Nonnoble Metal-Noble Metal Core-Shell Nanoparticle Electrocatalysts for $O_2$ Reduction," *J. Phys. Chem. B* 109(48):22701-22704, 2005.

Zhou et al., "Palladium alloy catalyst research to formic acid catalytic performance," *The 8th National Academic Conference of Hydrogen Energy*, Oct. 12, 2007 (w/ partial English translation), 4 pages.

Xue, "Chemistry of Bis(perfluoroalkylsulfonyl)imides and Related Compounds," Dissertation presented to the Graduate School of Clemson University, Aug. 1996, 251 pages.

Creager et al., "New Bis[(perfluororalkyl)sulfonyl]imide Ionomers for PEM Fuel Cells," Polymeric Materials: Science and Engineering 80, 600 (1999).

Zhou, "Synthesis and Characterization of Perfluorinated Sulfonimide Copolymers as Polymer Electrolyte Membranes," Dissertation presented to the Graduate School of Clemson University, Dec. 2002, 212 pages.

Uematsu et al., "Synthesis of novel perfluorosulfonamide monomers and their application," Journal of Flourine Chemistry 127, 1087-1095 (2006).

Jin et al., "Synthesis of Pd Nanocrystals Enclosed by {100} Facets and with sizes <10 nm for Application in CO Oxidation," *Nano Res.* 4(1): 83-91, 2011.

Hao et al., "Synthesis of monodisperse palladium nanocubes and their catalytic activity for methanol electrooxidation", Chin. Phys. B, vol. 19, No. 10 (2010) 106104-1-106104-5.

Telkar et al., "Shape-controlled preparation and catalytic activity of metal nanoparticles for hydrogenation of 2-butyne-1,4-diol and styrene oxide." Applied Catalysis A: General, 273 (2004) 11-19.

Zhou et al., "Determination of the Electron Transfer Number for the Oxygen Reduction Reaction: From Theory to Experiment," ACS Catalysis 2016 6, 4720-4728.

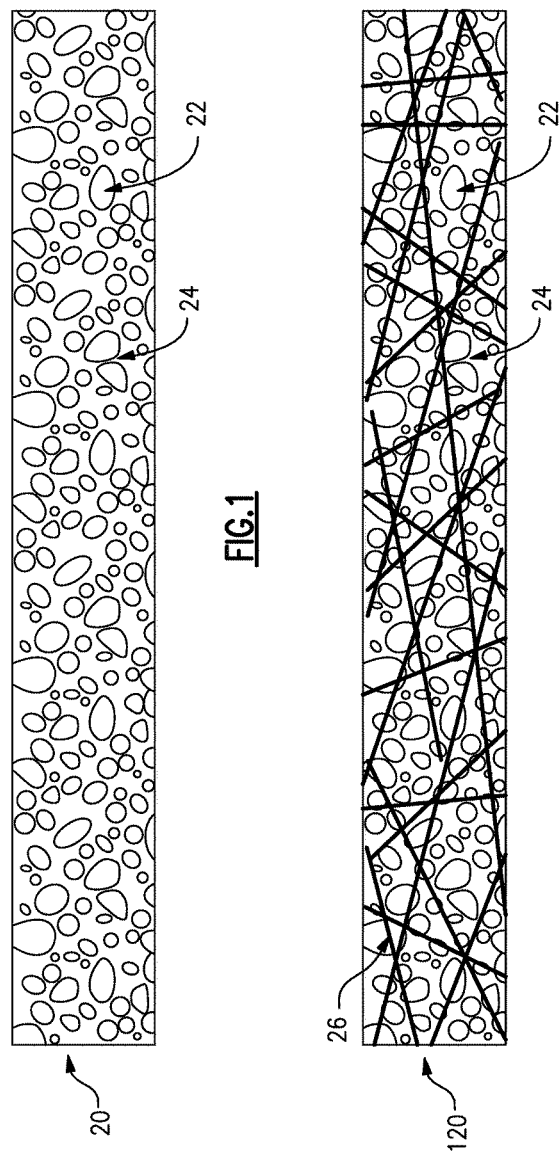

ELECTROLYTE MEMBRANE, DISPERSION AND METHOD THEREFOR

BACKGROUND

This disclosure relates to polymer electrolyte membranes and materials, such as those used in proton exchange membrane (PEM) fuel cells.

Fuel cells are commonly used for generating electric current. A single fuel cell typically includes an anode catalyst, a cathode catalyst, and an electrolyte between the anode and cathode catalysts for generating an electric current in a known electrochemical reaction between a fuel and an oxidant. The electrolyte may be a polymer membrane, which is also known as a proton exchange membrane or "PEM".

One common type of polymer exchange membranes is per-fluorinated sulfonic acid (PFSA) polymer membrane, such as NAFION® (E. I. du Pont de Nemours and Company). PFSA has a perfluorinated carbon-carbon backbone with perfluorinated side chains. Each side chain terminates in a sulfonic acid group that serves as a proton exchange site to transfer or conduct protons between the anode and cathode catalysts.

The proton conductivity of PFSA polymers varies in relation to relative humidity (RH) and temperature. The relation between conductivity and level of hydration is based on two different mechanisms of proton transport. One is the vehicular mechanism, where the proton transport is assisted by the water in the polymer, and the other is the hopping mechanism, where the proton hops along the sulfonic acid sites. While the vehicular mechanism is dominant at high relative humidity conditions, the hopping mechanism becomes important at low relative humidity conditions.

PEM fuel cells, especially for automobile applications, are required to be able to operate at high temperature ($\geq 100°$ C.) and low RH ($\leq 25\%$ RH) conditions, in order to reduce the radiator size, simplify the system construction and improve overall system efficiency. Consequently, PEM materials with high proton conductivity at high temperature and low RH conditions are needed.

PFSA polymer is usually prepared by free radical copolymerization of tetrafluoroethylene (TFE) and per-fluorinated (per-F) vinyl ether monomer (such as perfluoro-2-(2-fluorosulfonylethoxy) propyl vinyl ether, or "PSEPVE", for Nafion®). One approach to produce a PFSA polymer with improved proton conductivity is to decrease the TFE content in the product polymer. An indicator of conductivity of an electrolyte material is equivalent weight (EW), or grams of polymer required to neutralize 1 mol of base. The most common equivalent weights of commercially available PFSA polymer membranes (such as NAFION®) are between ~800 and ~1100 g/mol, which provide a balance between conductivity and mechanical properties. While PFSA polymer with EW in this range is needed, increasing conductivity below a certain EW threshold, saying ~750 g/mol, renders the electrolyte water soluble and not suitable for PEM applications.

Per-F sulfonimide (SI) acids (such as $CF_3-SO_2-N(H)-SO_2-CF_3$) show favorable properties, including strong acidity, excellent chemical and electrochemical stability, for PEM fuel cell applications. Linear per-F sulfonimide polymers (PFSI), prepared by copolymerization of TFE and SI-containing per-F vinyl ether monomer, were first reported by DesMarteau, et al (U.S. Pat. No. 5,463,005). Such type of linear PFSI polymers with the EW in the range of 1175-1261 g/mol for PEM application was reported by Creager, et al (Polymeric materials: science and engineering -WASHINGTON- 80, 1999: 600). Per-F vinyl ether monomer that contains two SI groups was also synthesized, and the corresponding linear PFSI polymer with the EW of 1175 g/mol was prepared and demonstrated to have high thermal and chemical stability in PEM fuel cell operating conditions (Zhou, Ph.D. thesis 2002, Clemson University). Reducing TFE content in the PFSI polymers is an efficient way to increase the proton conductivity of the product polymers. Linear PFSI polymer with the EW of 970 g/mol was reported in the literature (Xue, thesis 1996, Clemson University). However, such type of linear PFSI polymers with even lower EW is difficult to synthesis through free-radical copolymerization process and also renders the polymer water soluble below a certain EW threshold.

The preparation of PFSI polymer with calculated EW of ~1040 by chemical modification of PFSA polymer resin (in $-SO_2-F$ form) was reported in a Japanese patent (Publication No: 2002212234). Furthermore, a more efficient chemical modification process was reported by Hamrock et al (Publication No. WO 2011/129967). In this process, a linear PFSA polymer resin (in $-SO_2-F$ form) was treated with ammonia in acetonitrile (ACN) to convert the $-SO_2-F$ groups to sulfonamide ($-SO_2-NH_2$) groups, which then reacted with a per-F disulfonyl difluoride compound (such as $F-SO_2-(CF_2)_3-SO_2-F$) to convert to $-SI-(CF_2)_3-SO_3H$ in the final product. By starting with a 3M's PFSA (in $-SO_2-F$ form) with EW of ~800 g/mol, water-insoluble polymer electrolyte with EW as low as ~625 g/mol was reported. However, polymer electrolyte with even lower EW (<625 g/mol) resulted in a water soluble polymer and hence is not suitable for PEM applications.

Cross-linking is known as an effective strategy to prevent polymers from being soluble in water and organic solvents. This step is known to improve polymers' mechanical strength. Cross-linking PFSA polymer (in $-SO_2-F$ form) can be achieved by a couple reaction of a sulfonyl fluoride ($-SO_2-F$) group and a sulfonamide ($N_2H-SO_2-$) group to form a sulfonimide acid ($-SO_2-NH-SO_2-$) as a cross-linking site. The resulting sulfonimide group also works as a proton conducting site.

Uematsu et al (Journal of Fluorine Chemistry 127 (2006) 1087-1095) reported using thermal treatment (270° C.) to couple sulfonyl fluoride groups and sulfonamide groups in terpolymers of TFE, PSEPVE and sulfonamide-containing per-F vinyl ether monomer to form SI groups as cross-linking sites in the polymer matrix. An improvement in mechanical strength of polymer matrix was shown, without reduction in equivalent weight.

Hamrock et al (US2009/041614, US2006/0160958, US2005/0113528, U.S. Pat. No. 7,060,756, EP1690314) proposed to use aromatic cross-linking agents to react with PFSA polymer (in $-SO_2-F$ and/or $-SO_2-Cl$ form) to generate aromatic sulfone-containing cross-links in the polymer matrix. The proposed reaction conditions include thermal treatment at high temperature (160° C. or higher) and with a Lewis acid as catalyst. The proposed product polymer may have EW lower than 900 g/mol. The even lower EW ($\leq 700$ g/mol) cross-linked polymer products were not mentioned in these patents. In addition, the introduction of aromatic ring structures into the polymer matrix compromised chemical stability and could lead to inferior durability of product polymer membranes in highly acidic and highly oxidizing conditions in PEM fuel cells.

Lower EW crosslinked materials offer enhanced mechanical strength and higher conductivity, however making membranes from the cross-linked materials is challenging. A fully cross-linked polymer, eg., rubber, is not further deformable. WO2005045978 teaches a method of making membranes from two miscible polymers. Cross-linked polymer materials and linear polymer materials are not miscible. Additionally the disproportional swelling characteristics of the two conducting polymers and the slow cross-linking reactions limit the viability for making defect free membranes.

SUMMARY

Disclosed is a method of producing an electrolyte membrane includes providing a dispersion solution that has a crosslinked perfluorinated ionomer material and a linear perfluorinated ionomer material dispersed in a carrier fluid or mixture carrier fluids. The crosslinked perfluorinated ionomer material has an equivalent weight of 750 g/mol or less with respect to proton exchange acid groups. The linear perfluorinated ionomer material has an equivalent weight of 750 g/mol or more with respect to proton exchange acid groups. While none of the materials are water soluble. At least a portion of the carrier fluids is removed from the dispersion solution to thereby form an electrolyte membrane with the crosslinked perfluorinated ionomer material and the linear perfluorinated ionomer material.

Also disclosed is a dispersion solution for making an electrolyte membrane. The dispersion solution includes a mixture of the crosslinked perfluorinated ionomer material and the linear perfluorinated ionomer material dispersed in a carrier fluid or mixture carrier fluids.

Also disclosed is an electrolyte membrane that includes a solid mixture of the crosslinked perfluorinated ionomer material and the linear perfluorinated ionomer material.

Also disclosed is a reinforced electrolyte membrane that includes a solid mixture of the crosslinked perfluorinated ionomer material, linear perfluorinated ionomer material and a porous reinforcement mat.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 1 shows an example electrolyte membrane that has a crosslinked perfluorinated ionomer material and a linear perfluorinated ionomer material.

FIG. 2 shows an example fiber mat reinforced electrolyte membrane.

DETAILED DESCRIPTION

Figure 3:
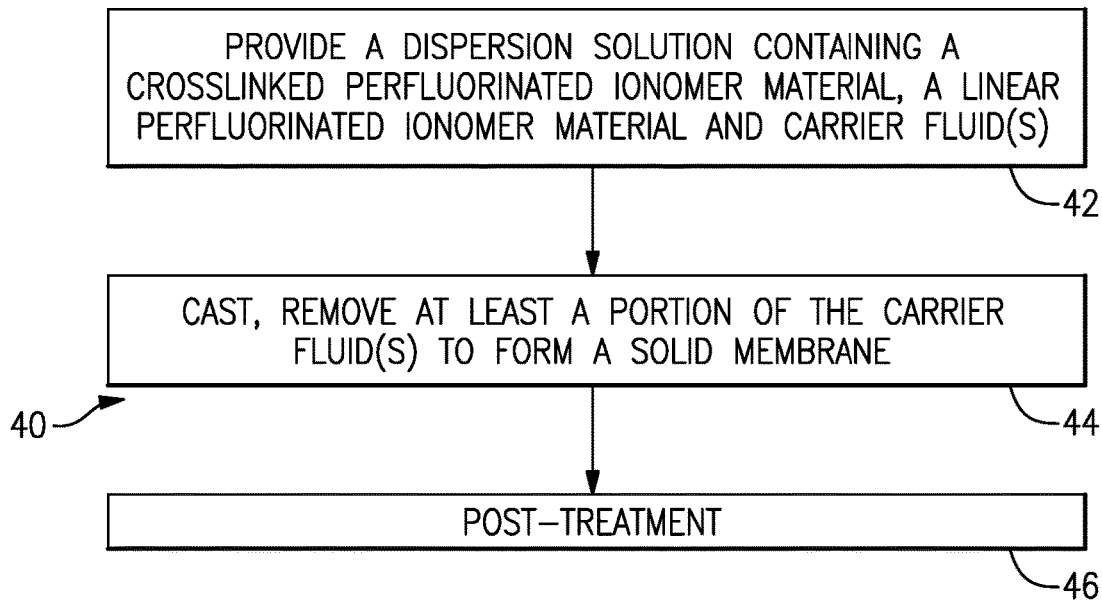
FIG. 3 shows an example method of producing an electrolyte membrane.

A description of the novel cross-linked proton exchange polymer materials, preparation of the dispersion solution, and making of the membranes is discussed.

The disclosed example proton exchange polymer materials, also known as ionomers, may be used as proton exchange membranes for PEM fuel cells or other applications where proton exchange is desirable. As will be described, the disclosed proton exchange material provides the ability to increase the density of proton exchange sites while maintaining resistance to solvents, such as water. As a comparison, an increase in the density of proton exchange sites by simply decreasing TFE content in linear PFSA polymers increases proton conductivity but also increases the polymer solubility in water, which is detrimental in PEM fuel cell applications. Conversely, a decrease in the density of proton exchange sites by simply increasing TFE content in linear PFSA polymers enhances polymers' water stability but decreases proton conductivity and debits PEM fuel cell performance.

An example proton exchange material includes perfluorinated carbon-carbon backbone chains and perfluorinated side chains extending off of the perfluorinated carbon-carbon backbone chains via an ether linkage. The perfluorinated side chains that have one or more sulfonimide (SI) groups, $-SO_2-NH-SO_2-$.

In embodiments, the perfluorinated proton exchange materials have a structure of $-(CF_2-CF_2)_N-CF_2-CF(-O-R_A-R_B)-$, where N on average is greater than or equal to zero, $R_A$ is a linear or branched perfluorinated chain, which includes a general structure of $-C_XF_{2X}O_Z-$, where X is greater than or equal to two and Z is greater than or equal to zero. $R_B$ is a linear or branched perfluorinated chain, which contains one or more SI groups and ends with a $-CF_3$ group or a $-SO_3H$ group, or covalently links to another $R_A$.

In embodiments, the side chains that extend off of the backbone chains may be end-capped chains, cross-link chains, or both. The end-capped chains may have at least one SI group, $-SO_2-NH-SO_2-$, and may include between two and five of SI groups or even greater than five SI groups. Additionally, the end-capped chains may be ending with a $-CF_3$ group or a $-SO_3H$ group. The portion of end-capped chains that are ended with $-CF_3$ may include multiple SI groups and the portion of end-capped chains that are ended with $-SO_3H$ may include at least one SI group. The cross-link chains may contain at least two SI groups and covalently link to the same or different polymer backbone chains.

In the proton exchange material, 20-99% of the perfluorinated side chains may be the end-capped chains and 80-1% of the side chains may be the cross-link chains. In other examples, 50-99% of the perfluorinated side chains are the end-capped chains and 50-1% of the side chains are the cross-link chains.

In one example, the proton exchange material has Structure 1 shown below, where N on average is greater than or equal to zero, $R_A$ is a linear or branched perfluorinated chains, which includes a general structure of $-C_XF_{2X}O_Z-$, where X is greater than or equal to two and Z is greater than or equal to zero. SI is sulfonimide group, $R_{C1}$, $R_{C2}$ and $R_{C3}$ are independently selected from $-(CF_2)_y-$ where y is 1-6 and $-(CF_2)_{y'}-O-(CF_2)_{y'}-$ where y' is 1-4, m, m', n and n' are greater than or equal to 1. m, m', n and n' may be equal to or different than each other, z is greater than or equal to zero. It is also understood that the end-capped chains and cross-link chains may occur randomly on the perfluorinated carbon-carbon backbone chains. The amounts of end-capped chains and cross-link chains may be as described above.

Structure 1

$$—(CF_2—CF_2)_{\overline{N}}—CF_2—CF—(CF_2—CF_2)_{\overline{N}}—CF_2—CF—(CF_2—CF_2)_{\overline{N}}—CF_2—CF—$$
$$| \qquad\qquad\qquad | \qquad\qquad\qquad |$$
$$O \qquad\qquad\qquad O \qquad\qquad\qquad O$$
$$| \qquad\qquad\qquad | \qquad\qquad\qquad |$$
$$R_A \qquad\qquad\qquad R_A \qquad\qquad\qquad R_A$$

$$\begin{pmatrix} SO_3H \\ | \\ R_{C3} \\ | \\ SI \end{pmatrix}_n \qquad \begin{pmatrix} SI—(CF_2)z—CF_3 \\ | \\ R_{C2} \\ | \\ SI \end{pmatrix}_{n'} \qquad \begin{pmatrix} SI \\ | \\ R_{C1} \\ | \\ SI \end{pmatrix}_m \qquad SI(\text{———}R_{C1}\text{———}SI)_{m'}$$

$$| \qquad\qquad\qquad | \qquad\qquad\qquad |$$
$$R_A \qquad\qquad\qquad R_A \qquad\qquad\qquad R_A$$
$$| \qquad\qquad\qquad | \qquad\qquad\qquad |$$
$$O \qquad\qquad\qquad O \qquad\qquad\qquad O$$
$$| \qquad\qquad\qquad | \qquad\qquad\qquad |$$
$$—(CF_2—CF_2)_{\overline{N}}—CF_2—CF—(CF_2—CF_2)_{\overline{N}}—CF_2—CF—(CF_2—CF_2)_{\overline{N}}—CF_2—CF—$$

A user may design the proton exchange material of the disclosed examples with a selected number of SI groups, backbone structure and side chain structure to provide a desired EW of proton exchange sites.

The EW of the proton exchange material may generally be less than 850. In further examples, the equivalent weight is less than 700. In further examples, the equivalent weight is less than 625. The disclosed range provides relatively high proton conductivity and a suitable rheology for membranes and electrode ionomers desired for a PEM fuel cell or other applications.

A method of fabricating such an electrolyte material, or proton exchange material, includes
  (A) preparing a perfluorinated polymer resin that includes perfluorinated carbon-carbon backbone and perfluorinated side chains that extend from the perfluorinated backbone chains with an ether linkage and terminate in a sulfonyl fluoride group, —$SO_2$—F,
  (B) exposing the perfluorinated polymer resin to ammonia gas to cause a conversion of —$SO_2$—F groups to sulfonamide groups, —$SO_2$—$NH_2$ and
  (C) treating the perfluorinated polymer having —$SO_2$—$NH_2$ groups with a sulfonyl fluoride-containing agent to convert at least a portion of —$SO_2$—$NH_2$ groups to SI groups, —$SO_2$—NH—$SO_2$—.
  (D) can be used to treat the polymer product from the step (C) with more of the sulfonyl fluoride-containing agent, or a different sulfonyl fluoride-containing agent, to convert the unreacted sulfonamide groups (if have) to SI groups. Step D is optional.

The disclosed SI chemistry creates cross-links that prevent the low EW polymer from being water soluble and thus permit the usage in electrochemical applications. In prior known linear PFSA polymers with low EW are water soluble and unusable for PEM fuel cells.

The electrolyte material produced according to the exemplary method could have EW of less than 700 and provide excellent proton conductivity in high temperature and low relative humidity conditions, while maintaining good chemical and mechanical stability in comparison to prior electrolyte materials.

The perfluorinated polymer resin of step (A) can be synthesized through a free radical polymerization step. Step (B) may be referred to as an amidification step, step (C) may be referred to as a gelation step and optional step (D) is a post-treatment step. The following illustrate non-limiting examples of steps (A), (B), (C) and (D). Where appropriate, the following abbreviations are used herein:
  ° C.: degrees Celsius
  3P: bis(pentafluoropropionyl) peroxide
  4P: bis(heptafluorobutyryl) peroxide
  ACN: acetonitrile
  atm: atmosphere
  DSC: differential scanning calorimetry
  EW: equivalent weight
  g: grams
  HFC 43-10: 2,3-dihydrodecafluoropentane
  M: molarity
  mtorr: millitorr
  PSEPVE: perfluoro-2-(2-fluorosulfonylethoxy) propyl vinyl ether
  POPS: perfluoro 3-oxa-4-pentene-sulfonylfluoride, $CF_2$=CF—O—$CF_2CF_2$—$SO_2$—F
  psig: pounds per square inch gauge
  RH: relative humidity
  rpm: rotations per minute
  TFE: tetrafluoroethylene
  TGA: thermal gravimetric analysis Step (A): Free Radical Polymerization The perfluorinated polymer resin is produced by free radical polymerization of TFE and per-F vinyl ether monomer (such as PSEPVE or POPS). In one example of the polymerization, a molar ratio of TFE to per-F vinyl ether monomer is approximately 3:1 or less, resulting in polymer resins of low EW (less than ~750). In a further example, the polymerization is carried out with per-F vinyl ether monomer only, which produces the homopolymer of the monomer with the lowest EW (as low as ~280).

The following examples illustrate further details of the polymer resin synthesis.

Example A-1 (TFE+PSEPVE Copolymerization)

A typical run involves adding 200 g of HFC 43-10 and 550 g of PSEPVE to a 600-mL autoclave and degassing the solution by freeze-pump-thawing 5 times to remove all oxygen. The autoclave is then filled with nitrogen to 0 psig and heated to 40° C. with stifling at a rate of 200 rpm. At the same time, the initiator feed line is cooled to −30° C.

The autoclave is pressurized to 105 psig using an equimolar mixture of TFE and $CO_2$. A 5.26 weight percent solution of 4P in HFC 43-10 is added by a high pressure pump to the autoclave at the flow rate of 10 mL/min for one minute, then reducing the flow rate to 0.0167 mL/min for the remainder of the polymerization. As TFE is consumed during the polymerization, the equimolar mixture of TFE and $CO_2$ is continuously added to keep the pressure of TFE constant throughout. After 5 hours, the initiator feed and TFE feed are stopped, and the autoclave is allowed to sit overnight so the remaining TFE is consumed.

The remaining $CO_2$ is then vented from the autoclave, and the solvent and excess monomer are removed by vacuum distillation at 120° C. and 20 mtorr, yielding 95 g of polymer resin with an equivalent weight of 775 g/mol.

Example A-2 (TFE+POPS Copolymerization)

A typical run involves adding 525 g of HFC 43-10 and 200 g of POPS to a 600-mL autoclave and degassing the solution by freeze-pump-thawing 5 times to remove all oxygen. The autoclave is then filled with nitrogen to 0 psig and heated to 35° C. with stifling at a rate of 200 rpm. Meanwhile, the initiator feed line is cooled to −30° C.

The autoclave is pressurized to 105 psig using equimolar mixture of TFE and $CO_2$. A 2.03 weight percent solution of 3P in HFC 43-10 is added by a high pressure pump to the autoclave at the flow rate of 14 mL/min for one minute, then reducing the flow rate to 0.0389 mL/min for the remainder of the polymerization. As TFE is consumed during the polymerization, the equimolar mixture of TFE and $CO_2$ is continuously added to keep the pressure of TFE constant throughout. After 5 hours the initiator feed and TFE feed are stopped, and the autoclave is allowed to sit overnight so the remaining TFE is consumed.

The remaining $CO_2$ is then vented from the autoclave. The solvent and excess monomer are removed by vacuum distillation at 120° C. and 20 mtorr, yielding 60 g of polymer with an equivalent weight of 700 g/mol.

Example A-3 (PSEPVE Homopolymerization)

124.25 g of degassed PSEPVE is added to a sealed glass reaction vessel which has previously been pacified with 3P initiator. 2.4 mL of a 3.38 weight percent solution of 3P in HFC 43-10 is added every 5 days, with the polymerization being carried out at 20° C. Five days after the fifth addition, the excess monomer is removed by vacuum distillation, yielding 36 g of PSEPVE homopolymer.

This polymer has been characterized by IR and TGA, showing 10% weight loss at 375° C. and 50% weight loss at 406° C. DSC shows a $T_g$ of 20.11° C. and a $T_m$ of 184° C.

Example A-4 (POPS Homopolymerization)

140 g of degassed POPS is added to a sealed glass reaction vessel which has previously been pacified with 3P initiator. 4.3 mL of a 3.38 weight percent solution of 3P in HFC 43-10 is added every 5 days, with the polymerization being carried out at 20° C. Five days after the fifth addition, the excess monomer is removed by vacuum distillation, yielding 33 g of the homopolymer.

This polymer has been characterized by IR and TGA, showing 10% weight loss at 365° C. and 50% weight loss at 402° C. DSC shows a $T_g$ of 44.02° C.

Example A-5 (Bulk Copolymerization)

128 g of degassed PSEPVE is added to the 100-mL stainless steel autoclave. With the $CO_2$ scrubber installed, the TFE and $CO_2$ mixture is slowly added with the temperature on the six point thermocouple located in the scrubber being always below 50° C. The neat TFE is added to the autoclave and the pressure of neat TFE inside the autoclave head space is kept at 55 psig throughout the reaction with a stirring rate of 200 rpm. Using a pump, 4.0 mL of a 0.106 M solution of 3P in perfluorohexane is added to the autoclave over 1 minute followed by 5 hours of a 0.00667 mL/min addition rate. Resulting polymer had an EW of approximately 550 g/mol by infrared spectroscopy.

Step (B) Amidification

The amidification includes exposing the perfluorinated polymer resin (in $—SO_2—F$ form) to ammonia to convert all $—SO_2—F$ groups to sulfonamide groups, $—SO_2—NH_2$. The use of ammonia gas permits the amidification to be conducted in a solvent-free process where the perfluorinated polymer resin is processed in a solid state rather than being dissolved in a liquid solvent solution. Prior to the exposing of the perfluorinated polymer resin to ammonia gas, decreasing the particle size of the polymer resin by technologies, including but not limited to cryogrinding, increases polymer's contact surface area with ammonia gas, and therefore, reduces the reaction time and improves the reaction yield. The elimination of the solvent provides (i) a relatively clean reaction that reduces undesired by-products from side reactions with the solvent, (ii) easier collection of the product by simplifying product work-up. The following illustrate further examples of the amidification using ammonia gas, which can also be conducted in a solution (solvent) process.

Example (B)-1 (Amidification of PSEPVE Homopolymer)

For the preparation of sulfonimide form of homopolymer, the substrate was placed in a round bottom flask and heated slowly under vacuum until the polymer started to flow. Then the flask was rotated to form thin film of the homopolymer on an internal flask surface. The reaction flask cooled down and ammonia gas was added to reach 1 atm pressure. The ammonia was added from time to time to keep constant pressure of 1 atm in the reaction flask.

For the work-up, one of two methods below were applied:
1) Product was extracted by dry ACN, the solvent was evaporated and the product was dried at 100-120° C. under vacuum; and
2) Product was dissolved in an organic solvent, including but not limited to ethyl acetate or diethyl ether, and washed with water. The solution was dried over $MgSO_4$, the solvent was evaporated and the product was dried at 100-120° C. under vacuum.

The second method allowed for the removal of all $NH_4F$ from the polymer product. Starting from 3.5 g of PSEPVE homopolymer (7.85 mmol, in $—SO_2—F$ form), 2.91 g of polymer product (in $—SO_2—NH_2$ form) was obtained with 84% yield.

Example (B)-2 (Amidification of PSEPVE Homopolymer)

6.67 g of PSEPVE homopolymer (in $—SO_2—F$ form) was added to a flask and gaseous ammonia was added at 20° C. As ammonia was consumed, more was added to keep the pressure constant at 15 psig for 3 days. $NH_4F$ was removed at 100° C. and 20 mtorr. ACN was added to the resulting polymer and heated at 80° C. for 12 hours to dissolve the polymer. The solution was decanted off and the ACN was removed by distillation to yield 5.78 g of polymer product (in $—SO_2—NH_2$ form). This polymer product is well soluble in polar organic solvents, with a solubility of 100 mg/mL in ACN.

Example (B)-3 (Amidification of TFE-PSEPVE Copolymer)

4.00 g of the copolymer of PSEPVE and TFE with an EW of 775 was added to a Ni autoclave and $NH_3$ was added and maintained at 30 psig and 20° C. for 12 hours. The $NH_4F$ produced was removed by vacuum distillation at 100° C. and 20 mtorr. Two aliquots of 150 mL ACN was added and heated to 80° C. to dissolve the sulfonamide polymer product. The solution was decanted off and the ACN was removed by distillation to yield 3.46 g of polymer product (in $—SO_2—NH_2$ form). This polymer is soluble in polar organic solvents, with a solubility of 10 mg/mL in ACN and 25 mg/mL in N-methyl-2-pyrrolidinone.

Example (B)-4 (Solution Amidification)

An amount of 6.52 g of the copolymer of TFE and PSEPVE is dissolved in refluxing perfluorohexane. Ammonia is bubbled through the solution to maintain a high reflux rate for several hours at room temperature. The ammonia is allowed to boil away and the volatiles, including ammonium fluoride, are all removed by heating to 110° C. at 50 mtorr. Dry ACN is then added to the flask and heated to refluxing. After three extractions with ACN, 5.67 g of white product is obtained in 87% yield.

Step (C)—Gelation

In the gelation step, the perfluorinated polymer in sulfonamide form from the amidification step (B) reacts with a first chemical agent to convert at least a portion of the sulfonamide groups to SI groups and generate cross-linking side chains at the same time. As an example, the first chemical agent includes $F—SO_2—Rf—SO_2—F$ and, optionally, $NH_2—SO_2—Rf'—SO_2—NH_2$, where Rf and Rf' are independently selected from $—(CF_2)_n—$ where n is 1-6, or $—(CF_2)_{n'}—O—(CF_2)_{n'}—$ where n' is 1-4. In further examples n is equal to or different than n'.

In embodiments, the gelation step can be conducted in either one or two step reactions. The one-step reaction includes co-adding $F—SO_2—Rf—SO_2—F$, $NH_2—SO_2—Rf'—SO_2—NH_2$ and the perfluorinated polymer in sulfonamide form into a reaction vessel with at least one polar solvent and at least one amine as catalyst. In examples, the polar solvent includes but not limited to ACN, 1,4-Dioxane, DMF, NMP and combinations thereof. The amine catalyst includes but not limited to trimethylamine (TMA), triethylamine (TEA), N,N-Diisopropylethylamine (DIPEA), 1,4-diazabicyclo[2.2.2]octane (DABCO) and combinations thereof. The reaction temperature can be approximately 25° C. to 100° C. or higher. In one example, the temperature is 50-80° C. The reaction time is several hours to up to one month, depending on the reaction reagents, ratio and reaction temperature.

The two-step reaction includes combining $F—SO_2—Rf—SO_2—F$ and $NH_2—SO_2—Rf'—SO_2—NH_2$ first in a reaction vessel with at least one polar solvent and at least one amine as catalyst (as described above), to cause a reaction to produce linear SI-containing oligomers that terminate in a $—SO_2—F$ at both ends. Then the perfluorinated polymer in sulfonamide form from the amidification step is added in the reaction solution to react with the linear SI-containing oligomers. In examples, $F—SO_2—Rf—SO_2—F$, $NH_2—SO_2—Rf'—SO_2—NH_2$ and TEA are combined in a reaction vessel with ACN and TEA. The mixture is stirred under 50-80° C. for one hour to one week, producing a linear SI-containing oligomers with $—SO_2—F$ groups on both ends. The perfluorinated polymer in sulfonamide form from the amidification step (optionally in ACN) is then added into the above reaction mixture. The reaction time is several hours to one month, depending on the reagents, ratio and reaction temperature.

In further examples, the one step or the two-step gelation includes combining X moles of the $F—SO_2—Rf—SO_2—F$, Y moles of the $NH_2—SO_2—Rf—SO_2—NH_2$ and Z moles of the perfluorinated polymer (calculated by sulfonamide groups), according to an equation $X/(Y+0.5Z) \geq 1$, where X, Y and Z are variable, $X>0$, $Y \geq 0$ and $Z>0$.

Step (D) Post-Treatment

Optionally, after the above gelation step, the unreacted sulfonamide groups in the perfluorinated polymer can be further treated with a second chemical agent to convert to SI groups and terminate the side chains with either a $—CF_3$ or a $—SO_2—F$, where the $—SO_2—F$ can be converted into a sulfonic acid group by a base solution treatment. For example, the second chemical agent, optionally with additional polar solvent and amine catalyst, is directly added into the reaction mixture from the above gelation step. Or the second chemical agent reacts with the isolated polymer product from the above gelation step in a reaction vessel with at least one polar solvent and at least one amine catalyst (as described above).

In a further example, the second chemical agent is selected from $F—SO_2—Rf—SO_2—F$, $F—SO_2—(Rf—SI)_m—Rf—SO_2—F$ and $F—SO_2—(Rf—SI)_{m'}—(CF_2)_{m''}CF_3$, where Rf is independently selected from $—(CF_2)_n—$ where n is 1-6 and $—(CF_2)_{n'}—O—(CF_2)_{n'}—$ where n' is 1-4, SI is sulfonimide, and m, m' and m'' are 0-6, respectively.

Example C-1

To a 20-ml glass vial in a nitrogen-protected glove box, 223 mg (0.25 mmol) of a perfluorinated polymer in sulfonamide form from the amidification step, 188 mg (2.5 mmol) of $F—SO_2—(CF_2)_4—SO_2—F$, 0.35 ml (Aldrich >99.5%, 2.5 mmol) of TEA, and 0.64 ml (Aldrich, anhydrous) of ACN were added. The reaction mixture was heated at 50° C. and stirred for 5 hours to form yellow gel. The reaction mixture was then heated at 80° C. and stirred for 1 day. The product gel was slowly acidified in 1M HCl solution for 12 hours at room temperature. The acidified gel was purified by immersing into 30% $H_2O_2$ for 3 weeks at room temperature and dried in hood to give colorless product.

The EW of the isolated polymer product is measured to be approximately 500 g/mol by titration. No sulfonamide group was detected by infrared spectroscopy. The water uptake ratio is up to 540%, but the product polymer is insoluble in boiling water. Under 80° C. and a wide RH range (20-95% RH), the polymer product exhibited ~2.8 times proton conductivity of Nafion® 112 membrane.

Example C-2

The sulfonamide polymer from the amidification step (1.5 g, 2.14 mmol) was placed into vial and 9 mL of ACN was added. The reaction mixture was stirred until suspension formed, then $F—SO_2—(CF_2)_2—SO_2—F$ (1.8 g, 6.77 mmol) and 2.5 mL of TEA were added. The reaction mixture was sonicated for 6 hours followed by stifling at 55-60° C. for 1 day. Then the reaction temperature was increased to 80-85° C. and reaction mixture was stirred for additional 1 day (One-step Gelation).

$F—SO_2—(CF_2)_2—SO_2—F$ (1.8 g, 6.77 mmol), 3 mL of ACN and 2.5 mL of TEA was added to the reaction mixture, followed by 6-hour sonication, 1 day stiffing at 55-60° C. and 1 day stirring at 80-85° C. (Post-treatment).

The reaction mixture was treated with $KOH/H_2O/DMSO$ (15/35/50 wt %) solution at 80-90° C. for about 1 hour, washing with D.I. water, then acidified and purified as described in Example C-1 to give colorless isolated polymer product with 64% yield.

Example C-3 (Two-Step Gelation)

A solution of $NH_2—SO_2—(CF_2)_4—SO_2—NH_2$ (0.0654 g, 0.182 mmol) and $F—SO_2—(CF_2)_4—SO_2—F$ (0.143 g, 0.374 mmol) in 0.4 mL of ACN and 0.1 mL TEA was stirred at 75-80° C. for 2.5 hours, giving $F—SO_2—((CF_2)_4—SI)_m—(CF_2)_4—SO_2—F$ solution, where m is equal to 2 on average.

Half of the amount of the above $F—SO_2—((CF_2)_4—SI)_m—(CF_2)_4—SO_2—F$ solution was added in a glove box to a solution of sulfonamide polymer from the amidification step (0.081 g, 0.182 mmol) in 0.3 mL of ACN and 0.1 mL of TEA. The reaction mixture was stirred for 64 hours at 55-60° C. (gelation occurred in ~10 hours). Then $F—SO_2—(CF_2)_4—SO_2—F$ (0.07 g, 0.183 mmol), ACN (0.3 mL), TEA (0.1 mL) were added to the reaction mixture and the mixture was stirred additional 16 hours at 55-60° C. and 20 hours at 80-85° C. (post-treatment step). After work-up as described in above examples, the polymer product is isolated with a yield of 45%.

By changing the types of starting polymers, reaction agents, agents' ratio and/or reaction conditions, product polymers with various structures, different EW and different physical properties (including mechanical and proton conductivity properties) can be obtained. Both stiffing and two-step gelation were useful to improve the product polymer yield.

A crosslinked perfluorinated ionomer material, such as one that can be produced as described above, or other crosslinked perfluorinated ionomer material that has an equivalent weight of 750 g/mol or less, generally has lower mechanical strength than higher equivalent weight polymer ionomer materials, especially under relatively high relative humidity conditions that can be found in fuel cells. In this regard, to reinforce the crosslinked perfluorinated ionomer material and thereby improve mechanical strength and enhance performance under relative humidity cycling, the crosslinked perfluorinated ionomer material that has an equivalent weight of 750 g/mol or less can be combined with a linear perfluorinated ionomer material and, optionally, deposited onto a porous reinforcement substrate, to form an composite electrolyte membrane. For example, FIG. 1 shows an electrolyte membrane 20 that includes a solid mixture of a crosslinked perfluorinated ionomer material 22 (shaded particle in the figure) and a linear perfluorinated ionomer material 24 (dispersed among the crosslinked perfluorinated ionomer material 22). For an example, the crosslinked perfluorinated ionomer material 22 includes perfluorinated sulfonimide polymer. In this example, the electrolyte membrane 20 is not reinforced with a porous substrate such as porous PTFE, polyethylene or PVDF mats or fiber mats. FIG. 2 shows another example electrolyte membrane 120. In this example, the crosslinked perfluorinated ionomer material 22 and the linear perfluorinated ionomer material 24 are disposed in a reinforcement fiber mat 26.

Figure 4:
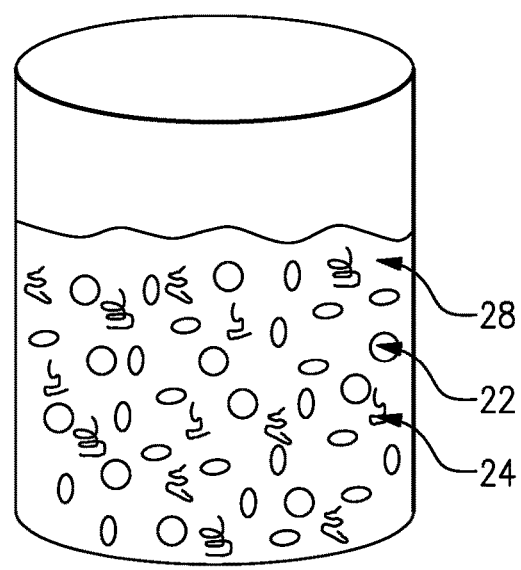
FIG. 4 shows a dispersion solution having a crosslinked perfluorinated ionomer material and a linear perfluorinated ionomer material dispersed in carrier fluids.

FIG. 3 shows an example method 40 of producing an electrolyte membrane, such as that shown in FIG. 1 or FIG. 2. In general, the method 40 includes steps 42 and 44. In this example, step 42 includes providing a dispersion solution that includes the crosslinked perfluorinated ionomer material and the linear perfluorinated ionomer material dispersed in carrier fluids. The crosslinked perfluorinated ionomer material has an equivalent weight of 750 g/mol or less with respect to proton exchange acid groups. The linear perfluorinated ionomer material has an equivalent weight of 750 g/mol or more with respect to proton exchange acid groups. The linear polymers disperse well in carrier fluids (such as alcohol/water mixture) while the cross-linked materials need pre-processing to enable dispersion in the carrier fluids. The equivalent weight is defined as a mass of the ionomer material that has one mole of proton exchange acid groups. An example of the dispersion solution is shown in FIG. 4 and includes the crosslinked perfluorinated ionomer material 22 and the linear perfluorinated ionomer material 24 dispersed in carrier fluids 28.

Step 44 in FIG. 3 includes removing at least a portion of the carrier fluid from the dispersion solution to thereby form an electrolyte membrane with the crosslinked perfluorinated ionomer material and the linear perfluorinated ionomer material. The following examples further illustrate aspects of the method 40.

In one example, the carrier fluid is a polar solvent, such as water, methanol, ethanol, propanol n-methal-2-pyrrolidone, dimethyl sulfoxide, other polar solvent or mixtures thereof. The carrier fluids are compatible with the crosslinked perfluorinated ionomer material such that the crosslinked perfluorinated ionomer material can be well dispersed in the selected carrier fluid.

In a further example, the selected carrier fluid and the crosslinked perfluorinated ionomer material are mechanically mixed with or without heating, to reduce a particle size of the crosslinked perfluorinated ionomer material from an initial average size that could be greater than 500 micrometers to a reduced average size of a few micrometers or less. In a further example, the mechanical mixing can include mechanical stirring, high sheer mixing, blade grinding, ultrasonic treatment, ball milling or other form of mechanical mixing. If heat is used, the mixing can be conducted at a temperature of 50-100° C. One purpose of the mechanical mixing is to break down the larger particle sizes of the initial crosslinked perfluorinated ionomer material into the second, micro-sized particles within the carrier fluids. This facilitates providing a homogenous and uniform dispersion solution.

In a further example, the dispersion solution includes a predetermined concentration of the crosslinked perfluorinated ionomer material. In one example, the concentration is 1-60 wt %. More preferably, the concentration is 5-30 wt % or 10-20 wt %. For concentrations that are greater than 60 wt %, the dispersion solution becomes too thick and can be difficult to handle in later steps and does not penetrate well into porous substrates. For concentrations of less than 1 wt %, the dispersion solution is too thin and may leave too much porosity in a porous substrate after removing the carrier fluids.

The linear perfluorinated ionomer material can serve as a binder with respect to the crosslinked perfluorinated ionomer material after the carrier fluids are removed. For example, the linear perfluorinated ionomer material can be a perfluorinated polymer that is chemically same as or different than the crosslinked perfluorinated ionomer material. In a further example, relative to a combined dry weight of the crosslinked perfluorinated ionomer material and the linear perfluorinated ionomer material, the linear perfluorinated ionomer material is present in an amount of 5-50 wt %, 15-30 wt % or 20-25 wt %.

Additionally, the linear perfluorinated ionomer material can be in the solid phase or in its own dispersion solution when added to the carrier fluids that have the crosslinked perfluorinated ionomer material. The carrier fluids that have the crosslinked perfluorinated ionomer material is selected to be compatible with the selected linear perfluorinated ionomer material. The term "compatible" means that the linear perfluorinated ionomer material can readily mix with or disperse in the carrier fluids. Upon combining the carrier fluids, the crosslinked perfluorinated ionomer material and the linear perfluorinated ionomer material together, the resulting solution can then be mechanically mixed, as described above.

If a supported membrane will be formed, the dispersion solution is then applied onto a selected reinforcement substrate. For example, the reinforcement substrate can be a porous mat, such as a porous polymeric mat. In a further example, the porous polymeric mat can be a perfluorinated polymer mat such as a porous poly-tetrafluoroethylene mat. Alternatively, the porous polymeric mat can be a partially perfluorinated polymer mat, such as porous polyvinylidene difluoride fiber mat, or a non-perfluorinated polymer mat, such as porous polyethylene mat. In one example, the porous mat has a relatively uniform thickness and the dispersion solution that is applied to the mat penetrates into the pores thereof. The porosity of the porous mat can be 60-99%, and more preferably is 85-95%. Further, the porous mat can have a thickness of 5-50 micrometers, or more preferably, 10-25 micrometers.

Additionally, the reinforcement substrate is readily wettable by the selected carrier fluid(s). If the reinforcement substrate is not compatible with the carrier fluid, a known surface treatment can be applied to the reinforcement substrate to make it more wettable before the dispersion solution is applied.

In one example, the dispersion solution is applied by casting, pouring or dipping the porous reinforcement substrate with the dispersion solution. Further, if casting is used, the casting can be applied to one or both sides of the porous reinforcement substrate. Additionally, multiple application cycles can be used on one or both sides of the porous reinforcement substrate. For an unreinforced membrane, the dispersion solution can be cast on a solid substrate and then removed after removal of the carrier fluid(s).

In a further example, the application of the dispersion solution to the porous reinforcement substrate is conducted at an elevated temperature up to approximately 100° C., or alternatively at room temperature. Further, the application can be conducted under ambient pressure or under vacuum, with or without a nitrogen atmosphere or with or without controlled relative humidity conditions. However, in one further example, the atmosphere is controlled such that the relative humidity is 50% or greater. Controlling the relative humidity to be 50% or greater suppresses evaporation of the one or more solvents in the dispersion solution. For example, especially if mixture solvents are used as carrier fluids and the solvents may have different evaporation rates. Should one of the solvents evaporate, either the crosslinked perfluorinated ionomer material or the linear perfluorinated ionomer material could precipitate out of the dispersion solution first and thus frustrate the homogenous or uniform resultant electrolyte membrane.

At least a portion of the carrier fluids are removed at step 44. For example, the removing of the carrier fluids can be conducted with or without a nitrogen atmosphere, with or without control of the atmosphere with regard to relative humidity, under elevated temperature, and/or under vacuum conditions. The selected conditions for removal will depend upon the selected solvents and, given this description, one of ordinary skill in the art will be able to determine appropriate removal conditions.

As also shown in FIG. 3, there is an optional step 46 that includes a post-treatment of the electrolyte membrane. For example, the post-treatment can include annealing the electrolyte membrane at 100-160° C. Optionally, the annealing may be conducted with or without a nitrogen atmosphere or with or without the application of pressure for a time of one minute up to several hours. The annealing can further remove the residual solvents that may be trapped within the electrolyte membrane after the removal step at 44, and also allow for intimate entanglements between the widely varying polymer types. Further, if a pressure is applied during the annealing, the pressure may facilitate uniform dispersion of the crosslinked perfluorinated ionomer material and the linear perfluorinated ionomer material with each other and through the pores of the porous reinforcement substrate, if used. In one example, a pressure of 200-500 pound-force per square inch gauge (psig) can be used.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method of producing an electrolyte membrane, the method comprising:
    providing a dispersion solution that includes a crosslinked perfluorinated ionomer material and a linear perfluorinated ionomer material dispersed in a carrier fluid or mixture of carrier fluids, the crosslinked perfluorinated ionomer material having an equivalent weight of 750 g/mol or less with respect to proton exchange acid groups, and the linear perfluorinated ionomer material having an equivalent weight of 750 g/mol or more with respect to proton exchange acid groups; and
    removing at least a portion of the carrier fluid or the mixture of carrier fluids from the dispersion solution to thereby form an electrolyte membrane with the crosslinked perfluorinated ionomer material and the linear perfluorinated ionomer material.

2. The method as recited in claim 1, wherein the crosslinked perfluorinated ionomer material includes perfluorinated sulfonimide polymer.

3. The method as recited in claim 1, wherein dispersion solution includes 1-60 wt % of the crosslinked perfluorinated ionomer material.

4. The method as recited in claim 3, wherein dispersion solution includes 5-30 wt % of the crosslinked perfluorinated ionomer material.

5. The method as recited in claim 1, wherein the providing of the dispersion solution includes mechanically reducing a particle size of the crosslinked perfluorinated ionomer material from an initial average size that is greater than 500 micrometers to a reduced average size that is less than 500 micrometers.

6. The method as recited in claim 1, wherein the providing of the dispersion solution includes mechanically mixing the crosslinked perfluorinated ionomer material and the carrier fluid or mixture of carrier fluids at a temperature of 50-100° C. to reduce a particle size of the crosslinked perfluorinated ionomer material from an initial size that is greater than 500 micrometers to a reduced size that is less than 500 micrometers.

7. The method as recited in claim 1, wherein the linear perfluorinated ionomer material is chemically the same as the crosslinked perfluorinated ionomer material.

8. The method as recited claim 1, wherein, relative to a combined dry weight of the crosslinked perfluorinated ionomer material and the linear perfluorinated ionomer material, the linear perfluorinated ionomer material is present in an amount of 5-50 wt %.

9. The method as recited in claim 1, further comprising applying the dispersion solution onto a reinforcement substrate.

10. The method as recited in claim 9, wherein the reinforcement substrate is a porous polymeric mat.

11. The method as recited in claim 10, wherein the porous polymeric mat is a porous perfluorinated polymer mat.

12. The method as recited in claim 10, wherein the porous polymeric mat is a partially perfluorinated polymer porous mat or a non-perfluorinated polymer porous mat.

13. The method as recited in claim 1, wherein the removing is conducted at a relative humidity of 30-80%.

14. The method as recited in claim 1, further comprising, after the removing, annealing at a temperature of 100-160° C. and under a pressure of 200-500 pound-force per square inch gauge (psig).

15. The method as recited in claim 1, wherein the linear perfluorinated ionomer material is chemically different from the crosslinked perfluorinated ionomer material.

* * * * *